US008266284B2

(12) United States Patent
Iverson

(10) Patent No.: US 8,266,284 B2
(45) Date of Patent: Sep. 11, 2012

(54) SYSTEM FROM REPUTATION SHAPING A PEER-TO-PEER NETWORK

(75) Inventor: Kris Iverson, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 597 days.

(21) Appl. No.: 12/121,798

(22) Filed: May 16, 2008

(65) Prior Publication Data

US 2009/0287819 A1 Nov. 19, 2009

(51) Int. Cl.
*G06F 15/16* (2006.01)

(52) U.S. Cl. ........................................ 709/225; 709/229

(58) Field of Classification Search .................. 709/204, 709/217, 224, 225, 223, 226, 229; 715/500
See application file for complete search history.

(56) References Cited

U.S. PATENT DOCUMENTS

| | | | |
|---|---|---|---|
| 7,133,368 B2 | 11/2006 | Zhang et al. | |
| 7,177,929 B2 * | 2/2007 | Burbeck et al. | 709/224 |
| 7,181,536 B2 | 2/2007 | Burbeck et al. | |
| 2002/0184310 A1 * | 12/2002 | Traversat et al. | 709/204 |
| 2004/0003071 A1 * | 1/2004 | Mathew et al. | 709/223 |
| 2004/0088369 A1 * | 5/2004 | Yeager et al. | 709/217 |
| 2004/0088646 A1 * | 5/2004 | Yeager et al. | 715/500 |
| 2004/0122926 A1 | 6/2004 | Moore et al. | |
| 2004/0133640 A1 * | 7/2004 | Yeager et al. | 709/204 |
| 2005/0052998 A1 | 3/2005 | Oliver et al. | |
| 2006/0042483 A1 * | 3/2006 | Work et al. | 101/91 |
| 2006/0149745 A1 | 7/2006 | Mengerink | |
| 2006/0253578 A1 * | 11/2006 | Dixon et al. | 709/225 |
| 2006/0253584 A1 * | 11/2006 | Dixon et al. | 709/225 |
| 2007/0016654 A1 * | 1/2007 | Bowles et al. | 709/217 |
| 2007/0033142 A1 | 2/2007 | Patten et al. | |
| 2007/0133520 A1 | 6/2007 | Kakivaya et al. | |
| 2007/0180078 A1 | 8/2007 | Murphy et al. | |
| 2008/0082662 A1 * | 4/2008 | Dandliker et al. | 709/225 |
| 2009/0138906 A1 * | 5/2009 | Eide et al. | 725/32 |

FOREIGN PATENT DOCUMENTS

| | | |
|---|---|---|
| JP | 2005039820 | 2/2005 |
| KR | 20080019981 | 3/2008 |

OTHER PUBLICATIONS

Boutaba et al., Management in peer-to-peer systems: Trust, reputation and security, Computer Networks, vol. 50, Issue 4, Mar. 15, 2006, pp. 469-471.*

Dewan, Prashant. Peer-to-Peer Reputations. Proceedings of the 18th International Parallel and Distributed Processing Symposium, 2004.*

Dunne. Using Mobile Agents for Network Resource Discovery in. ACM, 2001.*

(Continued)

*Primary Examiner* — Wing Chan
*Assistant Examiner* — Kostas Katsikis
(74) *Attorney, Agent, or Firm* — Wolfe-SBMC

(57) ABSTRACT

A method of managing access to resources in a network. A reputation for each network participant is evaluated by querying a data source for the reputation associated with the network participant. Based on the evaluated reputation, an appropriate level of access to network resources is determined from a plurality of levels of access to network resources for the corresponding network participant. An access control action is then performed to correspond to the determined level of access for the participant.

18 Claims, 6 Drawing Sheets

Exemplary Peer-to-Peer Networking Topology

400

OTHER PUBLICATIONS

Damiani, et al., "A Reputation-Based Approach for Choosing Reliable Resources in Peer-to-Peer Networks", Proceedings of the 9th ACM conference on Computer and communications security (CCS'02), Washington, DC, USA, SESSION: Peer to peer networks, Dated: Nov. 18-22, 2002, pp. 207-216.

Lee, "Peercracy: Self-Regulating Peer-to-Peer Network Using Feedback", Dated: May 14, 2003, pp. 1-12.

Wang, et al., "Trust and Reputation Model in Peer-to-Peer Networks", Proceedings of the 3rd International Conference on Peer-to-Peer Computing (P2P 2003), Publication Date: Sep. 1-3, 2003, pp. 150-157.

Stakhanova, et al., "A Reputation-Based Trust Management in Peer-to-Peer Network Systems", 2004 International Workshop on Security in Parallel and Distributed Systems, San Francisco, CA, (ISCA) Dated: 2004, pp. 510-515.

"PCT Search Report and Written Opinion", Application No. PCT/US2009/036118, (Oct. 22, 2009), 11 pages.

* cited by examiner

Exemplary Peer-
to-Peer
Networking
Topology

400

Exemplary Peer-to-Peer
Networking Environment

500

Basic Computing Device

600

SYSTEM FROM REPUTATION SHAPING A PEER-TO-PEER NETWORK

BACKGROUND

Computerized systems have made a significant contribution towards the advancement of modern society and are utilized in a number of applications to achieve advantageous results. The distribution of electronic data over network infrastructures is one such example that has benefited from the utilization of computerized systems. Network operators cultivate the behavior of the networks they manage to reduce costs, successfully enable applications, shut down policy violators, etc. . . . A reliable, well-managed and secure network that allows network participants to run the applications they want and access the data they need—without being subject to unnecessary risks—is a highly prized commodity within the public network community.

Virtual networks, (i.e., an implementation of a network of links which may or may not correspond to physical connections between nodes in the network) in particular have increased in popularity in recent years. Traditional mechanisms of managing physical networks are difficult or impractical to apply to virtual networks. For example, network operators are unable to assert control or set policies within a virtual network as they are able to with physical networks. In addition, participants in a virtual network are afforded little control over whether they are accessing trustworthy resources and/or unable to monitor how other participants may be using their local resources.

Peer-to-peer networks are one such example of virtual networks. A peer-to-peer computer network uses connectivity between participants in the network (termed "peers") and the cumulative bandwidth of the network participants rather than conventional centralized resources where a relatively low number of servers provide the core value to a service or application. Peer-to-peer networks provide a vital service for efficiently distributing files among its peers without requiring a costly and much less efficient centrally managed service.

Peer-to-peer networks are useful for many purposes, and are commonly used for sharing content files containing audio, video, data or anything in a digital format as its most common use. Popular peer-to-peer service BitTorrent™, for example, is frequently used in the legal community for distributing legal summaries (in document form). Peer-to-peer technology is also used to pass real-time data, such as telephony traffic.

An important aspect of peer-to-peer networks is that all peers within the network provide resources, including bandwidth, storage space, and computing power. Peer-to-peer networks are typically used for connecting nodes via largely ad hoc connections. Thus, as nodes arrive and the demand on the system increases, the total capacity of the system also increases. This is not typically true of client-server architecture with a fixed set of servers, in which adding more clients could adversely affect the rate of data transfer for all users.

A typical client application in a peer-to-peer network connects to the network by connecting to a node (usually a peer) in the network. Each node may have a number of other nodes connected to it, generally depending on the bandwidth available to the node. Each node in the network is thus added to a table of nodes, and is thus accessible to any peer in the network. Typically, a peer client will access an index containing the connection points (e.g., nodes) most likely available and will run through the list until it is able to establish enough peers to reliably access the greatest amount of functionality (e.g. data content) in the network. While the participant is connected, the peer-to-peer client application will continually refresh its index and reconnect to new peers with greater amounts of functionality, or as old peers shut down.

Once the participant is able to establish a connection to a node in the network, the network application typically has more data inside that the peer is able to use to refine its network path. The data typically includes a catalog of other peers who appear to be online at the time. The network application uses the catalog to establish connections to other peers and broaden the coverage of the search while other peers are performing similar operations simultaneously.

Participants in the peer-to-peer network can use a variety of mechanisms to query what data and operations are available to it, and the reliability of the response and quality of the operations will depend mostly on the peers that respond. For example, a participant may request an audio file of a performing artist and the peer-to-peer application will respond by searching for files that the application believes match the query on the machines of other participants that the application.

However, peer-to-peer networks are not without flaws. A common problem that peer-to-peer networks face is that a participant in a peer-to-peer network will not directly know which machines they are connected to through the network and what data they may be offering. Networks comprised of peers that are of ill repute may thus reduce the quality of the data and the quality of the operations. This allows network participants to be connected to machines of network users who knowingly or unwittingly may be distributing troublesome material, thus exposing a participant to malware, viruses, explicit sexual material, pirated content and other forms of undesired and/or unsolicited content.

Further exacerbating the problem is the common practice for purveyors and distributors of such content to engage in obfuscation so as to encourage acquisition by unwitting participants, usually with little to no accountability. For instance, a participant looking for a copy of a popular freely downloadable game based on a filename may inadvertently compromise their machine by installing malware which has been deliberately mislabeled to resemble (or match) the filename of the downloadable game.

Some currently available peer-to-peer applications provide a function that allows a network participant to "block" (i.e., reject connections to and from) other, specifically designated participants. However, a participant would need to be able to identify, with a certain amount of precision (typically an IP address) the other participants to be blocked. As a participant in a peer-to-peer network may not know which machines they are connected to, obtaining the specific identity of another participant may be difficult to ascertain.

Furthermore, application of the method is limited to only the specifically identified participants, and not to other participants of similar disrepute, and the process would need to be repeated for every successive participant to be blocked. Accordingly, in larger networks where greater numbers of unscrupulous users and/or infected machines may reside, the process can be quite inefficient, user-intensive, and still ineffective to address the future risk of exposure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments are directed to a reputation system for shaping a peer-to-peer network. Specifically, a system for shaping a peer-to-peer network's topology and overall behavior based on the reputation of the participants.

In one embodiment, a method implements the managing of access to resources in a peer-to-peer network based on the reputation of the network's participants. The reputation of each participant is evaluated, and an appropriate level of access to network resources is determined for that participant. An action is performed to either grant or deny access to network resources to the participant corresponding to the participant's determined level of access.

Another embodiment provides a method for managing access to local resources in the machine of a network participant. The individual reputation of a second network participant requesting to access or utilize the resources in the machine of a first network participant is evaluated, and eligibility (which may be user-defined) of the request is determined based on the second participant's reputation. An action is then performed to correspond to the determined eligibility.

Still another embodiment provides a system for monitoring and tracking the reputation of peer-to-peer network participants. The system includes a data storage component, which stores the reputation of network participants. The system responds to reputation queries for a network participant from the peer-to-peer network or a participant in the network by referencing the data storage component for the queried-for reputation. Reputations stored in the data storage are updated to correspond with network participant behavior.

Thus by tracking and monitoring the reputation of participants in a peer-to-peer network, a network or network service is able to provide an indication to the network participants of the reliability and quality of other participants they may wish to connect to, or allow to connect to them.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
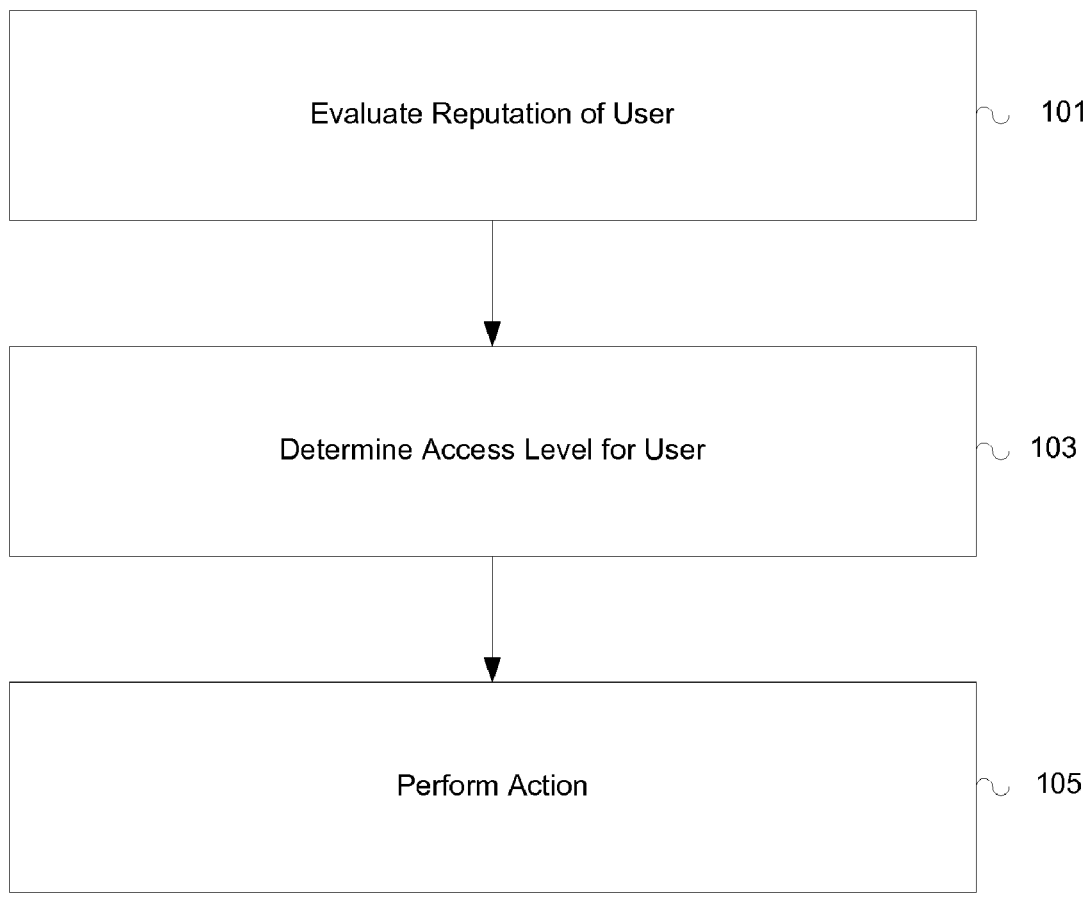
FIG. 1 depicts a flowchart of a method of managing access to resources in a network in accordance with various embodiments.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 1) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for shaping the topology of a peer-to-peer network based on the reputation of the participants in the network.

Managing Access to Network Resources

With reference now to FIG. 1, a flowchart 100 of a method of managing access to resources in a network is depicted, in accordance with one embodiment.

With reference now to step 101, the reputation for a network participant is evaluated. Within a peer-to-peer network, when a participant queries the network for a content file (e.g., an audio file), the participant will receive responses from the systems of other participants indicating the availability and/or location of the files if files that match the query are available within the network. In typical networks, some of the responses may come from poor-quality nodes (i.e., unscrupulous participants or participants with poor connections being used as nodes). At step 101, the participant evaluates the reputation for all respondents and prioritizes the peers to work with (i.e., connect to) based, in part, by the quality of their reputation. In one embodiment, responses from peers with poor reputations will be discarded and summarily rejected. In another embodiment, a user interface can be provided indicating the peer being accessed may be of ill repute and warning the participant to proceed at their own risk. In a still further embodiment, when joining a peer-to-peer network, participants may also use reputation, in part, to prioritize the nodes they want to connect with and access the network through. For instance, nodes may automatically attempt to connect to nodes with higher reputations over nodes with lower reputations.

Reputation may be implemented in a variety of representations, such as colors in a spectrum, by size, with distinctive icons, etc. . . . In one embodiment, reputation is implemented as a numerical value within a range of values, similar to a credit score, to indicate the quality of an object (e.g., a participant, a network service). A data storage component maintains a central view of the reputation of all objects in the network, and responds to reputation queries from network objects. In one embodiment, reputation could be implemented to reflect monitored or recorded participant behavior, such as community feedback, network policy violations, $3^{rd}$ party data sources such as internet block lists, etc. . . . In a further embodiment, reputation could also be implemented to consider a history of legitimate transactions a network participant participates in with a low ratio of complaints. Other embodiments include automated technologies that monitor the system and search for suspicious uses of the network, with discovered infractions negatively affecting a participant's reputation.

Connection to the network may vary according to embodiments. In one embodiment, executing a peer-to-peer application automatically connects the participant's computer system to the network through a network node, typically a peer. In another embodiment, connecting to the network may require a "log in" operation which may further include authentication procedures.

New participants (i.e., a participant that joins the network for the first time) are assigned an initial reputation (typically low). The participant's behavior within the system is recorded and stored in a reputation storage component, and evaluated as the need arises. A participant's reputation may be evaluated every time the network participant rejoins the peer-to-peer network, to establish the network participant's access level for the duration of the connection. For example, a network participant whose connection to the network is disrupted (e.g., by turning off the participant's computer system, or "logging off" from the network), may have the participant's reputation evaluated on subsequent attempts to rejoin the network. Reputation may also be evaluated each time a network participant attempts to access and/or use network resources or services. Reputation may also be automatically evaluated on a periodic basis (e.g., once a week) to account for recently observed participant behavior.

With reference now to step 103, a level of access to network resources for a participant is determined from a plurality of levels of access, based on the participant's evaluated reputation at step 101. The levels of access will encompass the entire range of reputation values, and may be apportioned in a variety of ways. For example, in embodiments which implement reputation as a numerical value in a set of values (e.g., from 1 to 100), levels of access may group reputations within smaller subsets (e.g., every 20 "points" of reputation). Continuing this example, a total of five subsets of reputation scores (1-20, 21-40, 41-60, 61-80, 81-100) may be apportioned from the total range of values. A level of access would thus correspond to a subset of reputation scores (e.g., 21-40) and one or more corresponding network functions. The participant is thereafter assigned a level of access which corresponds to the reputation of the participant. Each level of access may also correspond to a network function, and represent the minimum reputation required to access the network function.

A reputation element can also be applied to resources within the peer-to-peer network. In some embodiments, a peer-to-peer network may offer services (e.g., file storage, messaging, data streaming, etc. . . . ) with various rates of network resource consumption. In this case, the reputation of the resource is considered when the participant requests which resources to access. A network participant with a reputation lower than that of the resource will not be able to access or utilize the resource, or may only be granted a limited or partial access. Access levels within these embodiments may be apportioned to delineate the services which would utilize a relatively greater amount of network resources (e.g., data streaming) from those with less resource consumption (e.g., messaging). Accordingly, a low reputation score may correspond to a service with less resource consumption. Whereas a resource intensive feature may correspond to exceptionally high reputations.

With reference now to step 105, an action corresponding to the level of access assigned to the participant in step 103 is performed on behalf of the user. The action will typically be a control of the participant's access to network resources. The action performed may consist of granting access to resources which correspond to the level of access assigned to the participant. Granting access to resources corresponding to the level of access may also include granting access to the resources corresponding to the levels of access encompassing lower reputations. For instance, to extend the example of reputation as a numerical value, a participant assigned to a level of access, e.g., the level encompassing reputations 61-80, will also be granted access to network resources corresponding to levels of access encompassing reputations 1-20, 21-40 and 41-60.

An action may also consist of prohibiting access to network resources outside the level of access. For example, in continuing the previous example, a participant assigned to the level of access encompassing reputation scores of 61-80 will be prohibited from accessing network resources limited to reputation scores 81-100. Network resources may include, for example, network bandwidth consumption, an amount of processing performed on the systems of other participants in the network, an amount of network storage, specific applications or services with the network and access to locations outside the network. In one embodiment, participants are able to connect to, and use the resources of, only the other participants within the same access level.

In addition to participant-centric controls, reputation based policies can be provided at the service/application level to advise all participants what criteria to adhere to when selecting based on reputation. Network-wide policies for specific operations can also be enacted. For example, the peer-to-peer network application may require that data files can only be provided to the network for peers with a reputation above a certain value, and/or file downloading can be accomplished only by peers with a reputation above a certain value.

While it may still be possible for a compromised peer to join the network and provide access to all poor-quality participants, this can be handled within the network by requiring all participants evaluate/verify each other's reputation before responding to requests. Through the use of reputation for participant selection and network/application policies a peer-to-peer network organically grows into a network with a high reputation and offering the kinds of protection and quality previously associated with a well managed physical network.

Evaluating Reputation of a Network Participant

Figure 2:
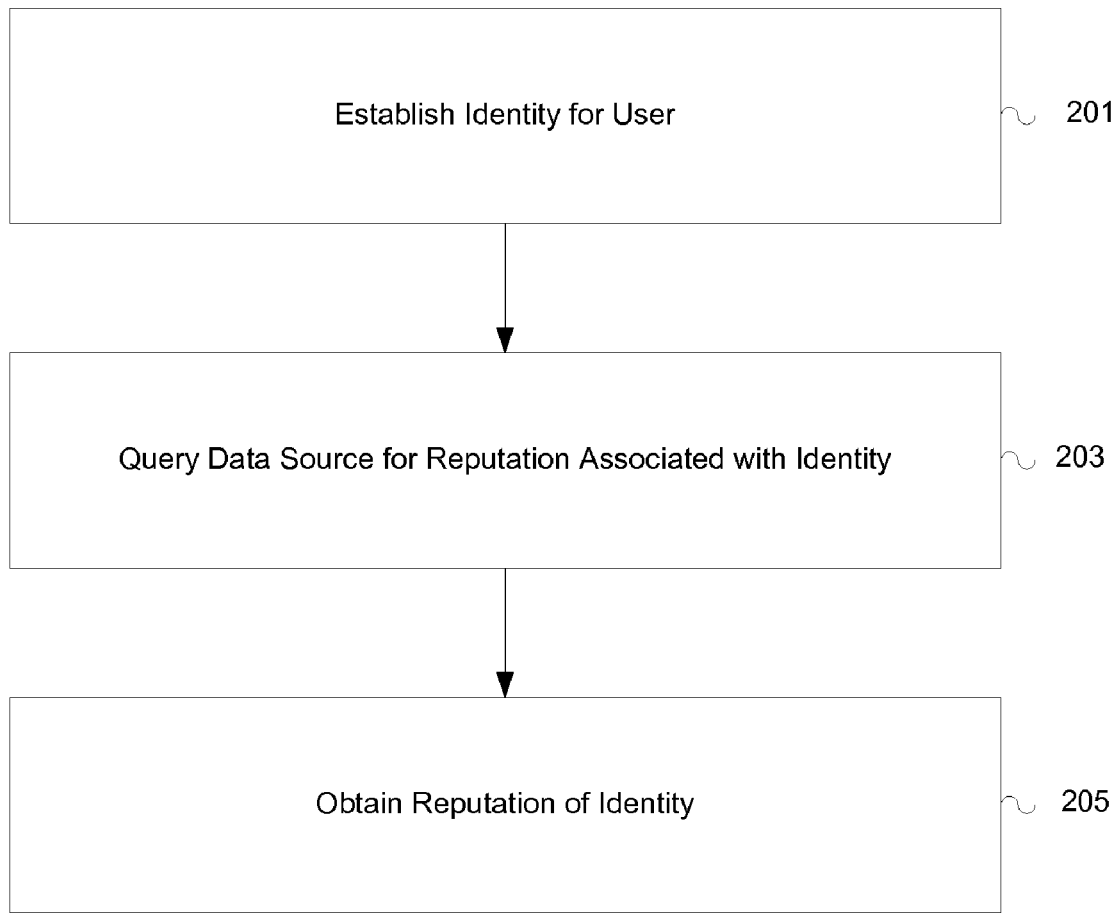
FIG. 2 depicts a flowchart of a method of evaluating a reputation for a network participant in accordance with various embodiments.

With reference now to FIG. 2, a flowchart 200 of a method of evaluating a reputation for a network participant is depicted, in accordance with one embodiment.

As noted above, different embodiments utilize different approaches for allowing a user to access some or all of the computer network. In some embodiments, the user's identity may include information regarding their role within an organization or community, as determined by a network administrator, according to achieved network milestones, or the like. Flowchart 200 depicts one approach of establishing a user's identity; in other embodiments, other approaches may be utilized.

With reference to step 201, the identity of the participant is established. The identity of the participant may be established by a device in the network (e.g., the computer system of another participant, or a proprietary device of the network administrator). In some embodiments, a participant may log in, e.g., by using a traditional username/password combination, or some form of biometric identification, or simply by beginning to use the computer. Given a participant's username and password, a network device can obtain additional information about the participant, e.g., their role or identity within the organization. The network device can then retain this identity information, in local memory, for example. According to another embodiment, the identity of the participant is simply the IP address of the computer system the participant uses to access the network.

The network (or network object) then maps the participant's identity to their location. In some embodiments, so long as a participant is logged in to a particular client device or computer, that client device or computer is treated as synonymous with their identity; for example, that client device is allowed access to any network resource that the participant's identity would permit them to access.

According to some embodiments, the participant's own network device extracts the participant's login information, such as the participant's username and password. In further embodiments, the peer-to-peer network may include a server. Given a participant's username and password, a network device can obtain the identity of the participant within the network, e.g., their role or identity within the organization by querying the network server based on the extracted login information.

With reference to step 203, once the identity of the participant has been established, a data source containing reputation data of identities of the participants in the network is queried for the reputation corresponding to the specific participant. The data source may for example, be implemented as any structure or component for the storage of data, such as a database.

As noted above, reputation data may comprise a range of representations, such as a range of numerical values, a collection of shapes or icons or a spectrum of colors.

With reference to step 205, the reputation data is sent from the data source containing reputation data of the identities of the participants in the network and obtained by the network device evaluating the reputation of the participant.

Managing Access to Local Resources in a Client Device

Figure 3:
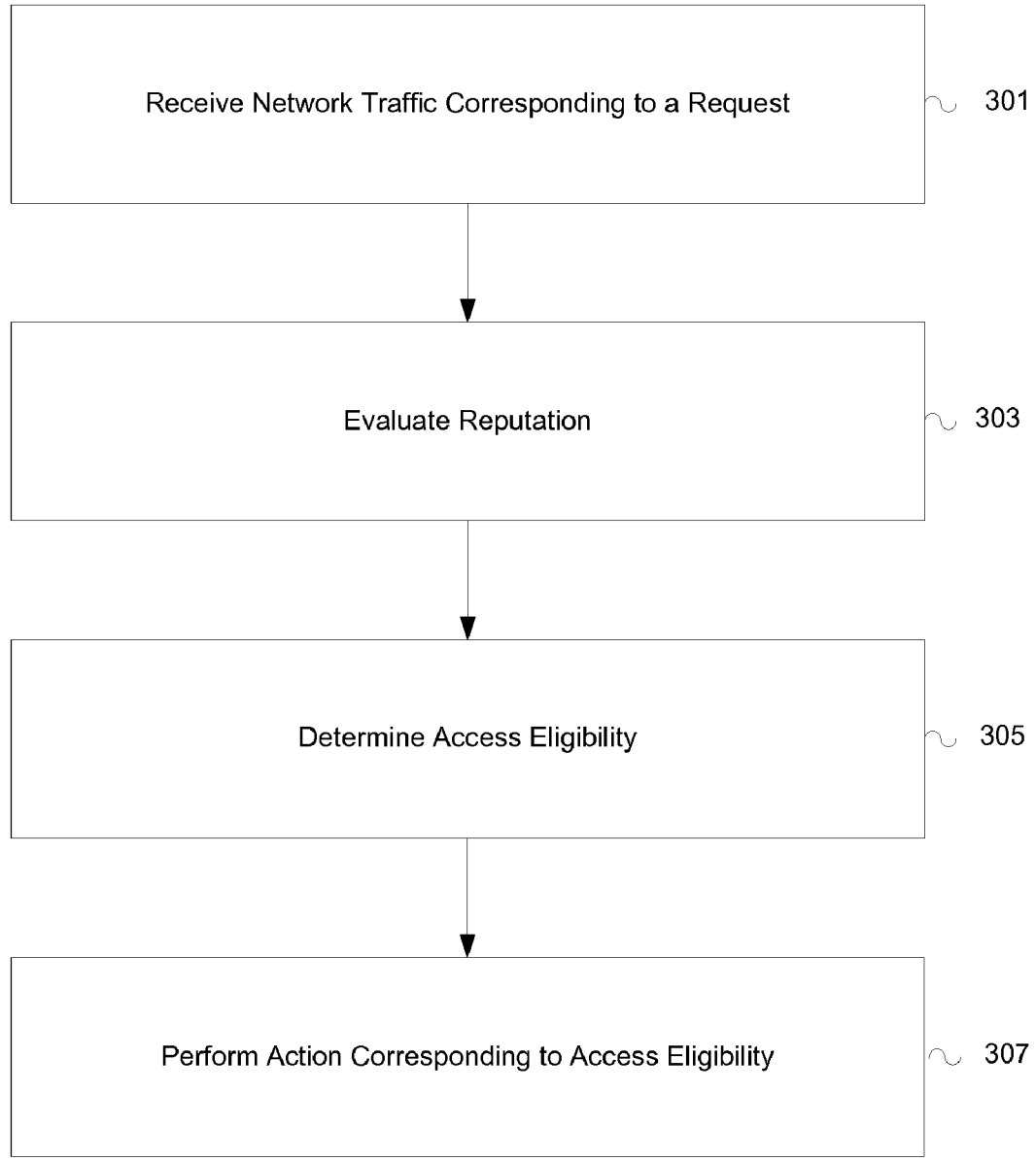
FIG. 3 depicts a flowchart of a method of managing access to local resources in a client device of a network participant in accordance with various embodiments.

With reference now to FIG. 3, a flowchart 300 of a method of managing access to local resources in a client device of a network participant is depicted, in accordance with one embodiment.

With reference now to step 301, the network device of a first participant in the network receives network traffic corresponding to a request from the network device of a second (requesting) participant in the network.

In different embodiments, a variety of requests may be received. Participants connected successfully in a peer-to-peer network may receive requests for access to some network resource or locally stored data (e.g., a content file stored locally), or to be used as a connection point for other participants. In another embodiment, the network traffic may comprise routine network traffic, and the "request" from the user is that the traffic be forwarded to its appropriate destination. These embodiments offer a uniform approach to processing packets, in that most or all types of network traffic can be handled in a similar manner, e.g., by treating network traffic as a series of requests.

With reference now to step 303, for each request received, the participant will evaluate the reputation of the requesting party. Evaluation of the reputation of a requesting participant is performed according to the description of flowchart 200 provided above. Accordingly, an identity is established for the requesting network participant. A data source containing reputation data for the participants in the network is queried for the reputation corresponding to the identity of the requesting network participant, and the reputation of the requesting participant is received by the network device (e.g., computer system) of the first network participant.

With reference now to step 305, eligibility to access local resources for the requesting participant is determined, based on the requesting participant's evaluated reputation, as determined in step 303. Eligibility to access local resources is determined by comparing the evaluated reputation of the requesting participant with eligibility criteria required for access local resources. Eligibility criteria may be pre-defined by the network system, or derived from user input. In one embodiment, a participant is queried to establish the conditions requesting participants must meet or exceed in order to access the local resources of the participant's computer system. The participant may be queried to establish eligibility criteria on an ad hoc basis for each incoming request. The participant may also set the conditions for eligibility the first time the network application connects to a network node, or whenever connection to the network is re-established.

Conditions for eligibility may vary according to different embodiments. For example, a participant may not grant eligibility to any peer, regardless of reputation, if the peer has a history of certain behaviors (e.g., distributing a file infected with malware). Other conditions for eligibility may include prohibiting eligibility to peers with reputations with a recent history of multiple infractions, to protect against a historically legitimate peer whose machine may have been compromised.

With reference now to step 307, an action corresponding to the eligibility determined in step 305 is performed. The action will typically be a control of the participant's access to local resources. The action performed may consist of granting access to resources requested by the requesting participant, if the reputation of the requesting participant meets or exceeds the eligibility criteria. The action performed may also reject a request for access to local resources, e.g., in the case the reputation of the requesting participant does not meet or exceed the eligibility criteria. Other actions may include granting partial access to a resource, or granting access for a limited duration.

In one embodiment, a network participant is able to specify through the network client application to grant a request for data or connection only to nodes with evaluated reputations equal to or greater than a certain reputation value (e.g., a reputation above that of ill repute). Thus, if a requesting peer attempts to connect to the network participant with a reputation lower than conditions for eligibility require, the connection may be rejected, or otherwise limited. Thus, a network peer who receives a certain number of complaints or with a history of policy violations would be able to access a progressively limited area of the network, and eventually barred from accessing other peers entirely. Accordingly, when all peers in the network participate in this way, the network will develop to be of high overall repute.

Exemplary Peer-to-Peer Network Topology

Figure 4:
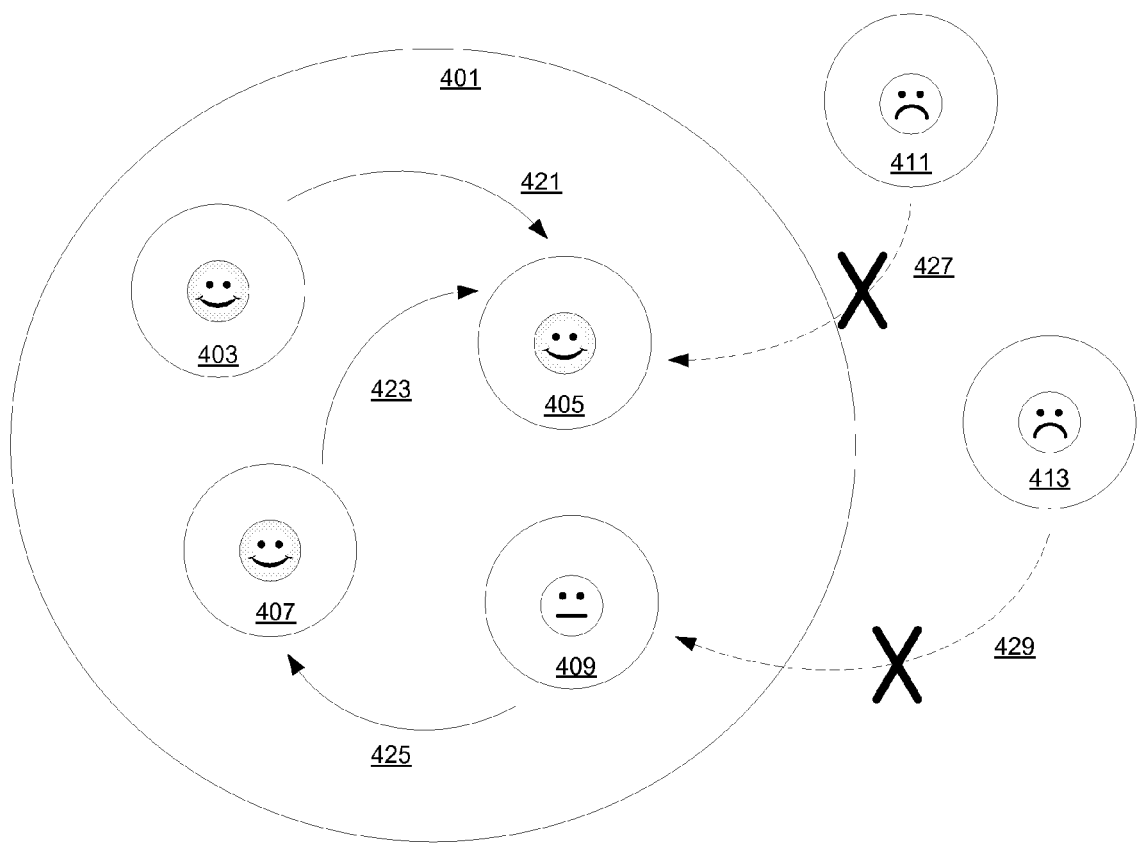
FIG. 4 depicts a graphical representation of an exemplary peer-to-peer network configuration in accordance with various embodiments.

With reference now to FIG. 4, an exemplary peer-to-peer network configuration 400 is depicted, in accordance with one embodiment.

As shown, exemplary network configuration 400 depicts a relatively simple network topology: a number of nodes, e.g., client devices 403, 405, 407, 409, 411 and 413, are distributed within and without a peer-to-peer network with reputation shaping 401, unbroken lines 421, 423 and 425 represent successful connections established between two nodes, broken lines 427 and 429 indicate an attempt at a connection between two nodes which has been rejected.

As shown, a client may have a good reputation, indicated by a smiling face (e.g., client devices 403, 405, 407, 409); a neutral reputation, indicated by a face with a neutral expression (409); or a poor reputation, indicated by a face with a frown (e.g., 411, 413). As depicted, clients with good or neutral reputations are able to join the network 401 and allowed to connect to other clients with the network (connections shown by unbroken lines 421, 423 and 425). Clients with poor reputations (e.g., 411 and 413) are shown beyond the coverage area of the network, and attempts to connect to a node within the network (represented by broken lines 427 and 429) are rejected.

Attempts to connect to a node within the network which are rejected are due to reputation controls within the network. In one embodiment, the network may have a centrally controlled policy which prevents nodes with a poor reputation from joining the network. In another embodiment, the individual nodes within the network may reject connection attempts from nodes with poor reputation.

Exemplary Peer-to-Peer Networking Environment

Figure 5:
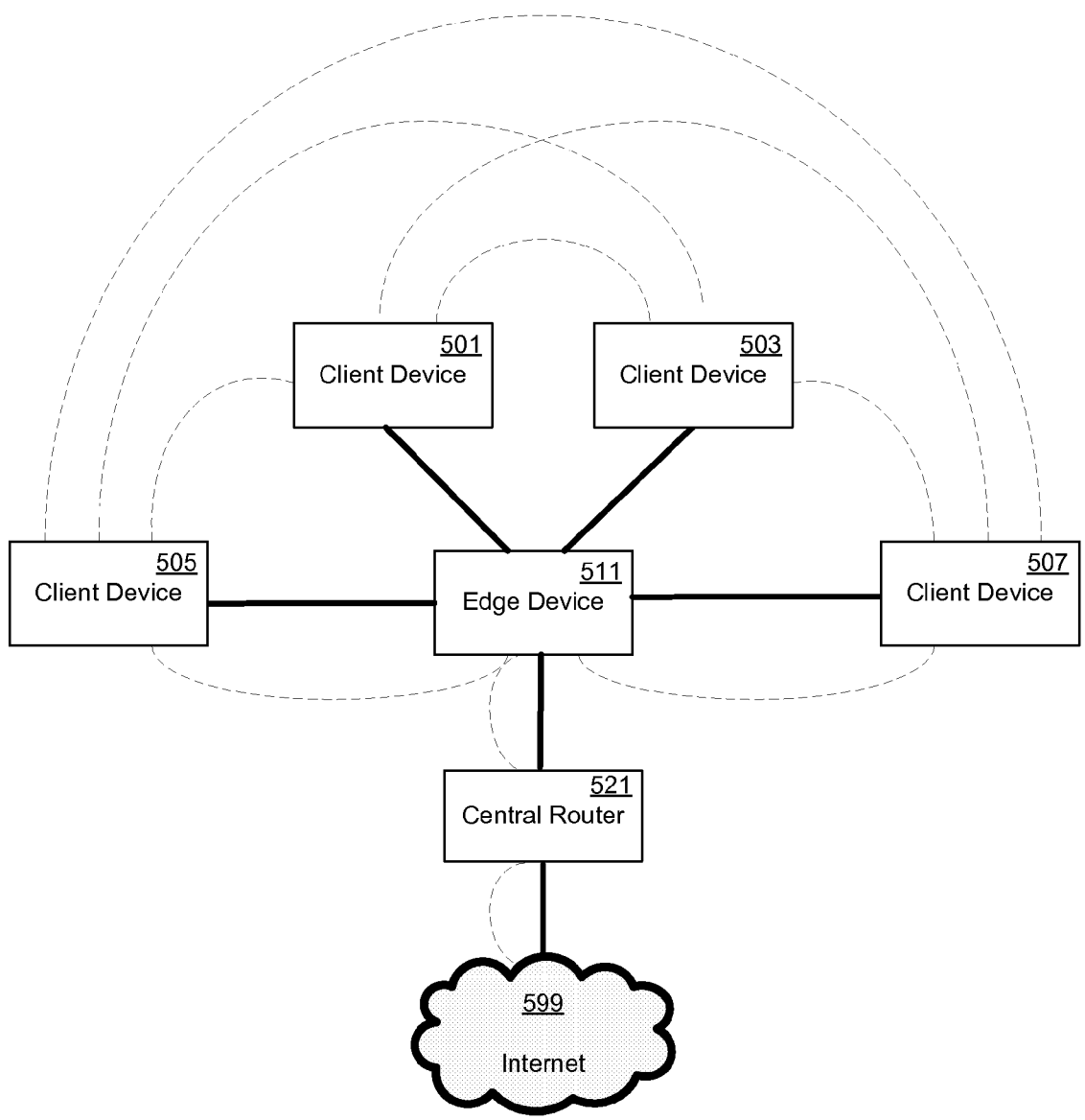
FIG. 5 depicts a graphical representation of an exemplary peer-to-peer networking environment in accordance with various embodiments.

With reference now to FIG. 5, an exemplary peer-to-peer networking environment 500 is depicted, in accordance with one embodiment.

As shown, exemplary peer-to-peer networking environment 500 depicts a relatively simple peer-to-peer networking environment: a number of peer-to-peer networking client devices within a local subnet, e.g., Client Devices 501, 503, 505, and 507, are attached to the local area network by means of a network edge device, e.g., edge device 511. As shown, clients may be the discrete computers used by network participants, and operating as nodes in the peer-to-peer network. Also, the edge device used in exemplary peer-to-peer networking environment 500 may vary, but will typically include layer 2/3 switching and routing functionality.

Exemplary peer-to-peer networking embodiment 500 is also shown to include a central router 521, e.g., to provide edge device 511 access to the Internet 399. In different embodiments, central router 331 may not be present, or may take a variety of forms, or provide a variety of features and services.

As depicted in exemplary peer-to-peer networking environment 500, dotted lines—representing an established connection within exemplary peer-to-peer networking environment 500—interconnect each node (e.g., Client Device 501, 503, 505 and 507) with every other node in the local subnet within the peer-to-peer network. Thus, as depicted, each node has established a peer-to-peer connection with every other node in the subnet in the peer-to-peer network.

According to some embodiments, peer-to-peer nodes are also able to connect to other nodes which are outside the local subnet. In addition to peer-to-peer network connections with the other nodes in the local subnet, Client Device 505 and 5-7 also include a connection to one or more nodes (not depicted) in the peer-to-peer network located within the Internet 599, but outside the local subnet. This feature is represented by the dotted line which also interconnects Client Device 505 and 507 with Internet 599, through Central Router 521 and Edge Device 511.

In the depicted embodiment, peer-to-peer networking environment 500 includes nodes within a shared subnet as well as nodes from beyond a local subnet. In different embodiments, peer-to-peer networking environment 500 may include only nodes within the same subnet. Peer-to-peer networking environment 500 may also include a plurality of nodes in a plurality of subnets, with only one node per subnet.

Basic Computing Device

Figure 6:
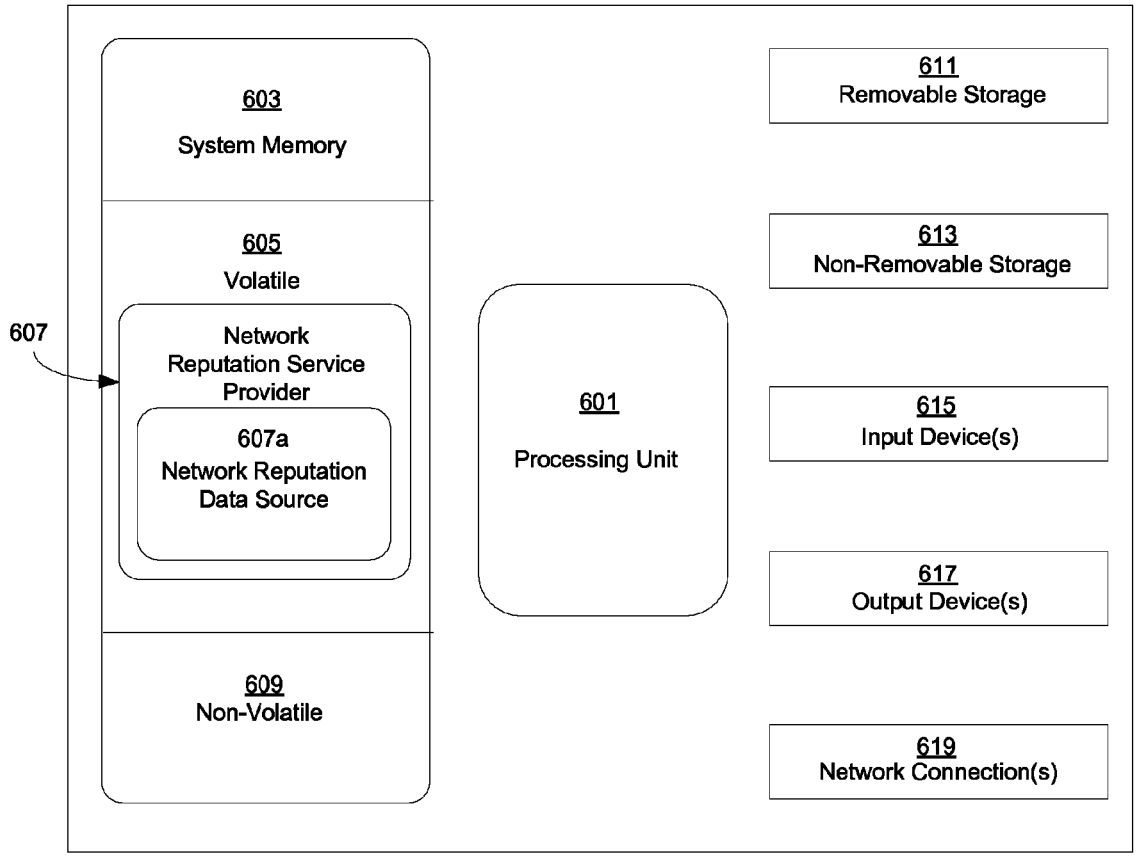
FIG. 6 depicts a graphical representation of a basic computing system in accordance with various embodiments.

FIG. 6 shows an exemplary computing device 600 according to various embodiments. Computing device 600 depicts the components of a basic computer system providing the execution platform for certain software-based functionality in accordance with various embodiments. Computing device 600 can be a networked computer system implementing a participant reputation service provider which stores and provides reputation data of participants of a network.

Computing device 600 can be implemented as, for example, a desktop computer system, laptop computer system or server computer system. Similarly, computing device 600 can be implemented as a handheld device (e.g., cellphone, etc.) Computing device 600 typically includes at least some form of computer readable media. Computer readable media can be a number of different types of available media that can be accessed by computing device 600 and can include, but is not limited to, computer storage media.

In its most basic configuration, computing device 600 typically includes processing unit 601 and memory 603. Depending on the exact configuration and type of computing device 600 that is used, memory 603 can be volatile (such as RAM) 605, non-volatile 609 (such as ROM, flash memory, etc.) or some combination of the two. In one embodiment, network reputation service provider 607, which sends and receives reputation data for participants in a peer-to-peer network, is instantiated in the non-volatile memory 605. Network reputation service provider 607 may also be implemented to monitor the behavior of the participants in a peer-to-peer network, or may receive reputation data from an external application Network reputation service provider 607 may also include network reputation data source 607a, which stores the reputation data of participants in a peer-to peer network. Network reputation data source 607a may, for example, be implemented as a database. A participant's behavioral data either observed by the network reputation service provider 607 or provided to the network reputation service provider 607 from an external application is used to update the reputation of the corresponding participant in the network reputation data source 607*a*.

Additionally, computing device 600 can include mass storage systems (removable 611 and/or non-removable 613) such as magnetic or optical disks or tape. Network reputation service provider 607 and network reputation data source 607*a* may also be implemented both removable 615 and non-removable 617 mass storage systems. Similarly, computing device 600 can include input devices 619 and/or output devices 621 (e.g., such as a display). Additionally, computing device 600 can include network connections 623 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of managing access to resources in a network, comprising:
   evaluating, using a computing device, a reputation for a network participant, wherein at least one representation of the reputation comprises an icon;
   determining, using the computing device, an appropriate level of access to network resources for the network participant from a plurality of levels of access to network resources based on the reputation of the network participant, wherein at least some network resources have associated reputation elements that are useable to further determine an access level to said at least some network resources and levels of access to network resources are configured, at least in part, to delineate corresponding utilization of network resource consumption;
   determining, using the computing device, eligibility of the network participant to access network resources based, at least in part, on a history of behaviors of the network participant, regardless of the reputation of the network participant, wherein the network participant is denied access to network resources if the history shows a pattern of certain undesirable behaviors; and
   performing, using the computing device, an action corresponding to the appropriate level of access to network resources determined.

2. The method of claim 1, wherein evaluating a reputation for a network participant comprises:
   establishing an identity for the network participant;
   querying a data source for a reputation associated with the identity established; and
   obtaining a reputation of the identity from the data source.

3. The method of claim 2, wherein establishing an identity comprises:
   extracting login information from a client device corresponding to the network participant; and
   querying a network server to obtain the identity based on the login information from the client device of the network participant.

4. The method of claim 2, wherein establishing an identity comprises determining an IP address of the client device corresponding to the client device of the network participant.

5. The method of claim 1, wherein the network is a virtual network.

6. The method of claim 5, wherein the virtual network is a peer to peer network.

7. The method of claim 1, wherein performing an action comprises:
   granting access to a set of available network resources, the set corresponding to a level of access to network resources.

8. The method of claim 1, wherein performing an action comprises:
   prohibiting access to a set of available network resources, the set corresponding to a level of access to network resources.

9. The method of claim 1, wherein the client device of the network participant is in the network.

10. The method of claim 1, wherein the client device of the network participant is attempting to join the network.

11. A method of managing access to local resources in a client device of a first network participant, comprising:
    receiving network traffic corresponding to a request from a client device of a second network participant;
    evaluating a reputation of the second network participant, wherein at least one representation of the reputation comprises an icon;
    determining an eligibility of the second network participant to access the local resources of the first network participant by comparing the reputation of the second network participant with eligibility criteria, wherein eligibility criteria is established, at least in part, from user input or pre-defined from the first network and wherein establishing eligibility criteria comprises:
        querying the first network participant for a set of conditions required to be eligible for access to local resources; and
        receiving the set of conditions required to be eligible for access to local resources from the first network participant; and
    performing an action corresponding to the access eligibility determined, wherein eligibility is further determined, at least in part, based upon a history of behaviors of the second network participant, regardless of the reputation of the second network participant, and wherein the second network participant is denied access to local resources of the first network participant if the history shows a pattern of certain undesirable behaviors.

12. The method of claim 11, wherein evaluating a reputation further comprises:
    establishing an identity for the second network participant;
    querying a data source for a reputation associated with the identity of the second network participant;
    obtaining a reputation of the identity from the data source.

13. The method of claim 11, wherein performing an action comprises:
    granting access to local resources for network participants with eligibility determined.

14. A computer system having a processor coupled to a memory, the memory having computer readable code, which when executed by the processor causes the computer system to implement:
    a network reputation service provider for determining a network reputation of a client device, wherein at least one representation of the network reputation comprises an icon; and
    a network reputation data source;
    wherein, in response to a request for the network reputation of the client device, the network reputation service provider determines the network reputation of the client device by referencing one or more identities associated with users of the client device stored in the reputation data source in response;

wherein the reputation of the client device is used to prioritize a connection to the client device; and wherein eligibility of the client device to access resources through the connection is determined based, at least in part, upon a history of behaviors of the client device, regardless of the reputation of the client device, and wherein the client device is denied access to resources if the history shows a pattern of certain undesirable behaviors.

15. The system according to claim 14, wherein requests for a network reputation of a client device are received by the network reputation service provider from a remote computing device.

16. The system according to claim 15, wherein the remote computing device is a computer system.

17. The system according to claim 16, wherein the remote computing device is a hand-held computing device.

18. The system according to claim 15, wherein the requests are sent from the remote computing device to the network reputation service provider via the Internet.

* * * * *